(12) United States Patent
Wiercinski et al.

(10) Patent No.: US 8,609,213 B2
(45) Date of Patent: Dec. 17, 2013

(54) WATERPROOFING MEMBRANE

(75) Inventors: Robert A. Wiercinski, Lincoln, MA (US); Anandakumar Ranganathan, Arlington, MA (US)

(73) Assignee: W.R. Grace & Co.-Conn., Columbia, MD (US)

( * ) Notice: Subject to any disclaimer, the term of this patent is extended or adjusted under 35 U.S.C. 154(b) by 269 days.

(21) Appl. No.: 13/124,977

(22) PCT Filed: Oct. 20, 2009

(86) PCT No.: PCT/US2009/061344
§ 371 (c)(1),
(2), (4) Date: Apr. 19, 2011

(87) PCT Pub. No.: WO2010/048198
PCT Pub. Date: Apr. 29, 2010

(65) Prior Publication Data
US 2011/0217528 A1 Sep. 8, 2011

(51) Int. Cl.
*B32B 9/02* (2006.01)
*B32B 33/00* (2006.01)
*B32B 7/12* (2006.01)
*E02D 19/00* (2006.01)

(52) U.S. Cl.
USPC ........ 428/40.1; 428/40.2; 428/41.7; 428/343; 428/351; 428/354; 52/169.14; 52/408

(58) Field of Classification Search
USPC ............ 428/40.1, 40.2, 40.3, 41.7, 41.8, 332, 428/343, 351, 352, 354–355 N; 52/169.14, 52/408
See application file for complete search history.

(56) References Cited

U.S. PATENT DOCUMENTS

| 3,900,102 A | 8/1975 | Hurst |
| 4,172,830 A | 10/1979 | Rosenberg et al. |
| 4,215,160 A | 7/1980 | Rosenberg et al. |
| 4,751,122 A | 6/1988 | May |

(Continued)

FOREIGN PATENT DOCUMENTS

| EP | 0414423 | 2/1991 |
| EP | 0610008 | 8/1994 |

(Continued)

OTHER PUBLICATIONS

Search report for Singapore Patent Application No. 201102540-0, Mar. 13, 2013, 8 pages.

(Continued)

*Primary Examiner* — Patricia Nordmeyer
(74) *Attorney, Agent, or Firm* — Stephan P. Williams; Craig K. Leon

(57) ABSTRACT

Disclosed are waterproofing membranes comprising the following laminated layers: layer A comprising a waterproofing adhesive; layer B comprising a carrier sheet; layer C comprising a releasable bonding material; and layer D comprising a protective coating; wherein (i) the laminated layers are arranged in the sequential order A-B-C-D; or (ii) the laminated layers are arranged in the sequential order B-C-D-A; or (iii) the laminated layers are arranged in the sequential order C-D-A-B. The membrane does not include a removable release sheet that is typically used to prevent the adhesive from adhering to the carrier sheet or other portion of the membrane when the membrane is rolled up. Also disclosed is a method of making the aforementioned membrane. Preferably, layer C will comprise a water soluble polymer, an alkali soluble polymer, or a homopolymer or copolymer of polyvinyl acetate.

24 Claims, 3 Drawing Sheets

(56) References Cited

U.S. PATENT DOCUMENTS

| | | |
|---|---|---|
| 4,994,328 A | 2/1991 | Cogliano |
| 5,254,661 A | 10/1993 | Wilson |
| 5,316,848 A | 5/1994 | Bartlett et al. |
| 5,496,615 A | 3/1996 | Bartlett et al. |
| 5,824,401 A | 10/1998 | Jenkins et al. |
| 6,500,520 B1 | 12/2002 | Wiercinski et al. |
| 6,546,679 B1 | 4/2003 | Bushberger |
| 2002/0037405 A1 | 3/2002 | Naipawer et al. |
| 2005/0196590 A1 | 9/2005 | Seth et al. |

FOREIGN PATENT DOCUMENTS

| | | |
|---|---|---|
| GB | 1265952 A | 3/1972 |
| GB | 2107608 | 5/1983 |
| JP | 55158961 | 12/1980 |
| JP | 1214654 | 8/1989 |

OTHER PUBLICATIONS

Written Opinion for Singapore Patent Application No. 201102540-0, Mar. 13, 2013, 7 pages.

WATERPROOFING MEMBRANE

FIELD OF THE INVENTION

The present invention relates to a waterproofing membrane that does not have a removable release sheet to prevent the adhesive portion of the membrane from adhering to the carrier sheet or other portion of the membrane when the membrane is rolled up.

BACKGROUND OF THE INVENTION

Sheet-like waterproofing membrane laminates are well-known for application to concrete and other substrates. These laminates typically comprise a carrier sheet and a pressure sensitive adhesive layer. In many applications, the waterproofing sheet material is applied to a concrete substrate that has already been formed, such as a building foundation. In such a case, the adhesive layer of the membrane is applied against the cured concrete surface. In another technique, the waterproofing membrane is affixed to the concrete form or lagging with the carrier sheet against the lagging and the adhesive portion facing toward the cavity in which the concrete is poured. The adhesive portion of the membrane will adhere to the freshly poured concrete, thus providing a fully adhered waterproofing membrane on the cured concrete surface after the lagging is removed. This technique is sometimes referred to as "blind side" (or pre-applied) waterproofing. A similar process may be used on horizontal surfaces where the membrane is applied to compacted soil or gravel or to a concrete slab, with the adhesive portion facing upward, then casting concrete against the membrane.

In addition to the carrier sheet and pressure sensitive adhesive layer, typical commercial waterproofing membranes include a removable release sheet that is used to prevent the adhesive portion of the membrane from adhering to the carrier sheet or other portion of the membrane when the membrane is rolled up. This release sheet must be removed from the membrane prior to or during installation and disposed in the trash, thus creating environmental waste.

U.S. Pat. No. 3,900,102 (Hurst) discloses one such membrane comprising a polyethylene support sheet, a bituminous adhesive and a releasable siliconized paper for protecting the adhesive. The release paper is removed as the membrane is unrolled and adhered to a building substrate (see Hurst FIG. 4). U.S. Pat. No. 4,751,122 (May) discloses a membrane laminate that includes a sheet-like paper substrate with a release coating (e.g., silicone) on one face and a waterproofing pressure sensitive adhesive on the other face. This membrane also includes a removable strip along the edge which, when removed, permits overlapping seams to adhere. U.S. Pat. No. 4,172,830 (Rosenberg) and U.S. Pat. No. 4,215,160 (Rosenberg) disclose paperless membrane laminates that include a silicone release coating on the outer surface of the carrier sheet to prevent the adhesive layer from adhering to the carrier sheet when the membrane is rolled up. U.S. Pat. No. 5,254,661 (Wilson) discloses a similar type of paperless membrane laminate in which the release coating is a water-based silicone emulsion. During installation, edge portions of the release coating may be removed by wet abrasion to permit adhesion of overlap seams of adjacent membranes.

U.S. Pat. No. 4,994,328 (Cogliano) discloses a waterproofing membrane capable of adhering to freshly poured concrete (i.e., blind-side or pre-applied waterproofing). The membrane has a bituminous adhesive layer that is coated with a non-tacky, water-insoluble polymeric coating such as, for example, a polyvinyl alcohol, silica, and glycerin mixture in a weight ratio of 1:10:0.5. The coating purportedly protects the adhesive layer while permitting a strong adhesive bond to freshly poured concrete. However, the coating can be slippery when wet and, thus, not suitable for foot traffic. U.S. Pat. No. 5,316,848 (Bartlett) discloses a similar blind-side waterproofing membrane that includes a carrier layer, a pressure sensitive adhesive layer, and a protective coating on the adhesive layer, wherein the coating may be selected from various types of polymers, preferably an acrylic-based elastomer, such as styrene butyl acrylate. U.S. Pat. No. 5,496,615 (Bartlett) discloses a similar membrane laminate where the protective coating has a finely divided particulate material, such as sand, calcium carbonate, cement, titanium dioxide, etc., dusted thereon.

U.S. Pat. No. 6,500,520 (Wiercinski) discloses a membrane laminate having a carrier support sheet, an adhesive layer, and embedded on the adhesive layer a layer of granulated inorganic particulates capable of reacting with concrete, such as aluminum oxide trihydrate, silica dioxide, fly ash, blast furnace slag, alkali or alkaline earth metal salts, etc. The particles may be attached to the adhesive layer using a water-soluble material such as ethylene vinyl acetate or polyvinyl alcohol.

Typical commercial waterproofing membranes used for blind-side (or pre-applied) applications include a release sheet and unroll wrong side up with the adhesive portion facing outward. This forces the installer to first unroll then flip over a large, unwieldy membrane prior to installing it. Alternatively, two installers are needed to lift the heavy roll so that it may be unrolled from the top.

It would be advantageous to provide a waterproofing membrane that binds strongly to concrete cast against its surface. In addition, it would be advantageous to provide a waterproofing membrane that has an outer surface that will tolerate foot traffic. It would also be advantageous to provide a waterproofing membrane that does not require a release sheet that must be removed and disposed of at the job site. In addition, it would be advantageous to provide a waterproofing membrane that is right side up (i.e., carrier sheet facing down and adhesive/protective coating facing up) when it is unrolled at the job site.

SUMMARY OF THE INVENTION

The present invention embraces a waterproofing membrane comprising the following laminated layers:
layer A comprising a waterproofing adhesive;
layer B comprising a carrier sheet;
layer C comprising a releasable bonding material; and
layer D comprising a protective coating;
wherein (i) the laminated layers are arranged in the sequential order A-B-C-D; or (ii) the laminated layers are arranged in the sequential order B-C-D-A; or (iii) the laminated layers are arranged in the sequential order C-D-A-B. The membrane preferably does not include a removable release sheet that is typically used to prevent the adhesive from adhering to the carrier sheet or other portion of the membrane when the membrane is rolled up.

The waterproofing membrane may be rolled into a roll (e.g., at time of manufacture and for storage and handling), then unwound from the roll (e.g., at time of manufacture and/or at time of installation). In one embodiment, the laminated layers are arranged in the sequential order A-B-C-D prior to the membrane being rolled into a roll. When this membrane is rolled into a roll, layer D comprises the outermost layer of the roll and layer A comprises the innermost layer of the roll. When layer D contacts layer A as the membrane is rolled up, it adheres to that layer. When the roll of waterproofing membrane is unrolled, layer C, which is only loosely adhered to layer B, detaches from layer B, thus leaving the layers of the unrolled membrane arranged in the sequential order C-D-A-B.

In another embodiment, the laminated layers are arranged in the sequential order B-C-D-A prior to the membrane being rolled into a roll. When this membrane is rolled into a roll, layer B comprises the outermost layer of the roll and layer A comprises the innermost layer of the roll. When layer A contacts layer B as the membrane is rolled up, it adheres to that layer. When the roll of waterproofing membrane is unrolled, layer C, which is only loosely adhered to layer B, detaches from layer B, thus leaving the layers of the unrolled membrane arranged in the sequential order C-D-A-B.

With either of the foregoing embodiments, the laminated layers are arranged in the sequential order C-D-A-B when the membrane is unrolled from a roll. This membrane may then be affixed to a concrete lagging or other substrate (e.g., soil, gravel or slab) with layer B facing the lagging or substrate and layer C facing the space where concrete will be poured or sprayed. The concrete will strongly adhere to layers C-D-A, thus providing a fully adhered waterproofing membrane on the concrete surface. Since layer B becomes the bottom layer as the membrane is unrolled, the membrane may be unrolled directly onto the surface of the lagging or substrate to which it is affixed—i.e., it unrolls right side up—thus making it easier for the installer to install the product.

The present invention also embraces a method of making a waterproofing membrane comprising a waterproofing adhesive (layer A), a carrier sheet (layer B), a releasable bonding material (layer C) and a protective coating (layer D), wherein the membrane does not include a removable release sheet, the method comprising the following steps:
(S1) coating the bonding material (layer C) onto the carrier sheet (layer B) and drying;
(S2) coating the protective coating (layer D) onto the bonding material (layer C) and drying;
(S3) either (i) coating the adhesive (layer A) onto the uncoated face of the carrier sheet (layer B); or (ii) coating the adhesive (layer A) onto the protective coating (layer D); and
(S4) winding the four-layer laminate into a roll with the adhesive (layer A) facing inwards.

In a preferred embodiment, layer C of the above-described embodiments will comprise a water soluble polymer, an alkali soluble polymer, or a homopolymer or copolymer of polyvinyl acetate.

DETAILED DESCRIPTION OF THE INVENTION

Figure 1:
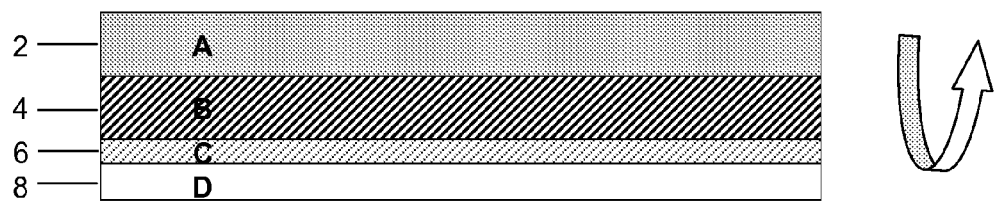
FIG. 1 depicts a cross-section of a first embodiment of the waterproofing membrane of the present invention prior to the membrane being rolled into a roll.

One embodiment of the waterproofing membrane of the present invention is depicted in FIG. 1, which shows a cross-section of the membrane taken along the width of the membrane. Typical commercial membranes will have a width in the range of 30 to 185 cm, more typically 60 to 140 cm, preferably 80 to 130 cm. They typically will have a length of from 5 to 60 m, more typically 15 to 36 m, and are rolled up into a roll.

As shown in FIG. 1, the waterproofing membrane comprises four laminated layers arranged in the sequential order A-B-C-D wherein
layer A comprises a waterproofing adhesive 2;
layer B comprise a carrier sheet 4;
layer C comprises a releasable bonding material 6; and
layer D comprises a protective coating 8.

Figure 2:
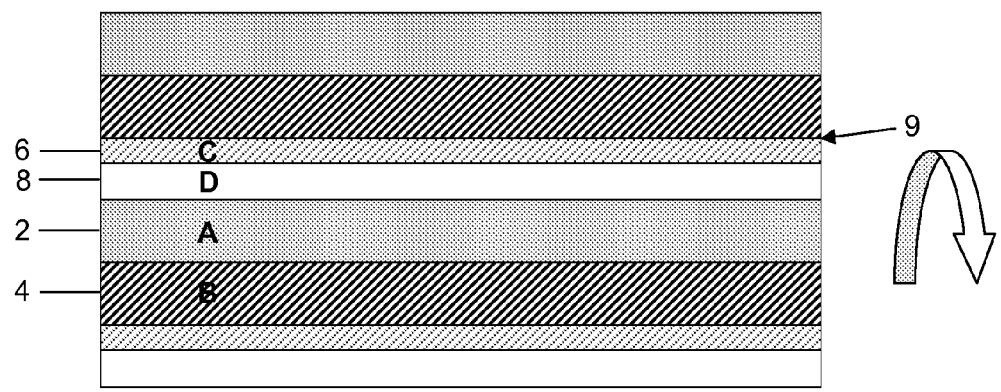
FIG. 2 depicts a cross-section of two layers of the waterproofing membrane of FIG. 1 after the membrane has been rolled into a roll.
Figure 3:
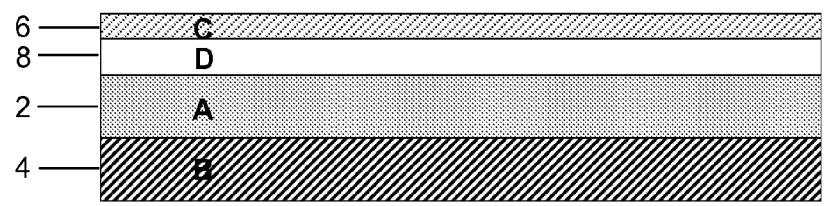
FIG. 3 depicts a cross-section of the waterproofing membrane of the present invention after the membrane has been unrolled from the roll depicted in FIG. 2.

The waterproofing membrane may be rolled into a roll (as shown by the arrow in FIG. 1), wherein layer D (protective coating 8) comprises the outermost layer of the roll and layer A (adhesive 2) comprises the innermost layer against the core of the roll. FIG. 2 depicts a cross-section of two layers of the waterproofing membrane of FIG. 1 after the membrane has been rolled into a roll. When layer D (protective coating 8) contacts layer A (adhesive 2) as the membrane is rolled up, it adheres to that layer. When the roll of waterproofing membrane is unrolled (as shown by the arrow in FIG. 2), layer C (releasable bonding material 6), which is only loosely adhered to layer B (carrier sheet 4), detaches from layer B at B-C interface 9. FIG. 3 depicts a cross-section of the waterproofing membrane after it has been unrolled (whether during the manufacturing process or just prior to installation) in which the layers of the unrolled membrane are arranged in the sequential order C-D-A-B. Since layer B (carrier sheet 4) becomes the bottom layer as the membrane is unrolled, the membrane may be unrolled directly onto the surface of the lagging or substrate to which it is affixed—i.e., it unrolls right side up—thus making it easier for the installer to install the product.

Figure 4:
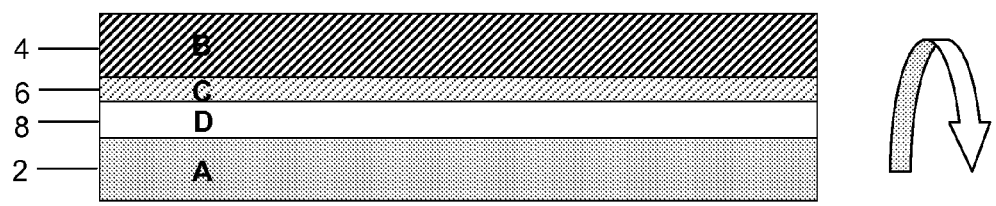
FIG. 4 depicts a cross-section of a second embodiment of the waterproofing membrane of the present invention prior to the membrane being rolled into a roll.

A second embodiment of the waterproofing membrane of the present invention is depicted in FIG. 4. In this embodiment, the four laminated layers are arranged in the sequential order B-C-D-A, wherein B, C, D and A are as previously defined with respect to the first embodiment.

Figure 5:
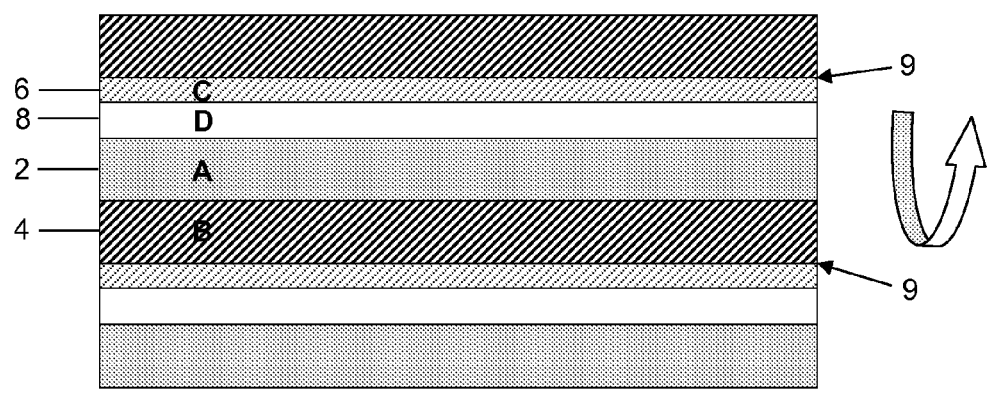
FIG. 5 depicts a cross-section of two layers of the waterproofing membrane of FIG. 4 after the membrane has been rolled into a roll.
Figure 6:
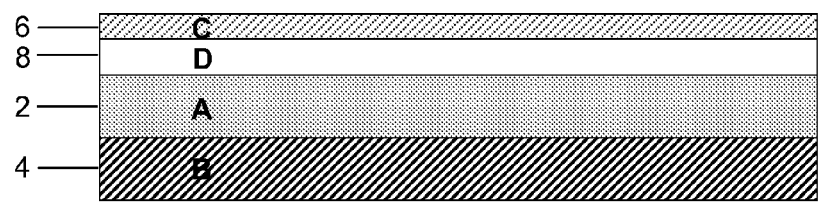
FIG. 6 depicts a cross-section of the waterproofing membrane of the present invention after the membrane has been unrolled from the roll depicted in FIG. 5.

The waterproofing membrane may be rolled into a roll (as shown by the arrow in FIG. 4), wherein layer B (carrier sheet 4) comprises the outermost layer of the roll and layer A (adhesive 2) comprises the innermost layer against the core of the roll. FIG. 5 depicts a cross-section of two layers of the waterproofing membrane of FIG. 4 after the membrane has been rolled into a roll. When layer A (adhesive 2) contacts layer B (carrier sheet 4) as the membrane is rolled up, it adheres to that layer. When the roll of waterproofing membrane is unrolled (as shown by the arrow in FIG. 5), layer C (releasable bonding material 6), which is only loosely adhered to layer B (carrier sheet 4), detaches from layer B at B-C interface 9. FIG. 6 depicts a cross-section of the waterproofing membrane after it has been unrolled the first time (whether during the manufacturing process or just prior to installation) in which the layers of the unrolled membrane are arranged in the sequential order C-D-A-B. Since layer B (carrier sheet 4) will be the top layer during the first unrolling (i.e., the membrane will be upside down), it is advantageous to rewind the roll (preferably during manufacture) with the carrier sheet (layer B) as the outermost layer and the bonding material (layer C) as the innermost layer against the core of the role. This rewinding will then enable the membrane roll to be unwound directly onto the surface of the lagging or substrate (i.e., right side up), with the carrier sheet against the substrate, thus making it easier for the installer to install the product.

Figure 7:
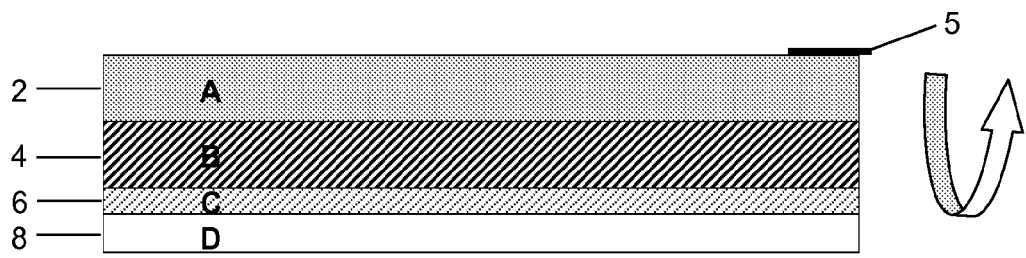
FIG. 7 depicts a cross-section of a third embodiment of the waterproofing membrane of the present invention, including a tear strip, prior to the membrane being rolled into a roll.
Figure 8:
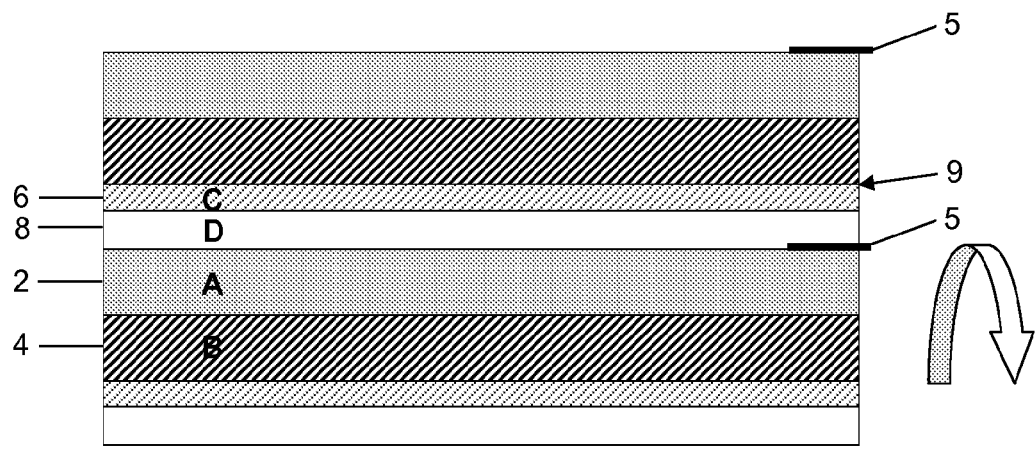
FIG. 8 depicts a cross-section of two layers of the waterproofing membrane of FIG. 7 after the membrane has been rolled into a roll.
Figure 9:
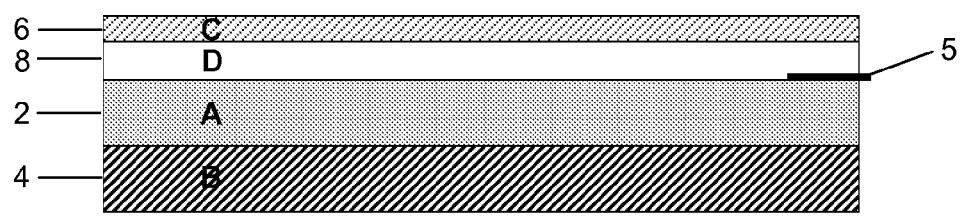
FIG. 9 depicts a cross-section of the waterproofing membrane of the present invention after the membrane has been unrolled from the roll depicted in FIG. 8.
Figure 10:
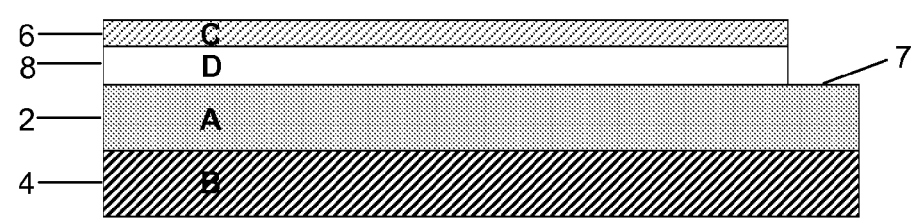
FIG. 10 depicts a cross-section of the waterproofing membrane of FIG. 9 after the tear strip has been removed.

A third embodiment of the present invention is depicted in FIG. 7. This embodiment is essentially identical in structure and operation to the first embodiment except that it further includes a narrow tear strip 5 removably adhered to adhesive 2 along an edge of the waterproofing membrane, the tear strip being positioned on the side of the adhesive opposite that which is adhered to the carrier sheet. The tear strip will typically have a width of 3 to 25 cm, more typically 5 to 16 cm. FIG. 8 depicts a cross-section of two layers of the waterproofing membrane of FIG. 7 after the membrane has been rolled into a roll. As with the first embodiment, when layer D (protective coating 8) contacts layer A (adhesive 2) as the membrane is rolled up, it adheres to that layer. When the roll of waterproofing membrane is unrolled (as shown by the arrow in FIG. 8), layer C (releasable bonding material 6), which is only loosely adhered to layer B (carrier sheet 4), detaches from layer B at B-C interface 9. FIG. 9 depicts a cross-section of the waterproofing membrane after it has been unrolled in which the layers of the unrolled membrane are arranged in the sequential order C-D-A-B. When tear strip 5 is pulled off by the installer, it may remove a narrow portion of layers C-D (approximately equivalent to the width of overlap of layers C-D on tear strip 5), leaving an exposed adhesive surface 7, as shown in FIG. 10. A second membrane may then be installed adjacent to the first membrane, but with the seam overlapping and adhering to exposed adhesive surface 7, thus providing a waterproof seal at the seam.

Although not shown, a similar fourth embodiment with a tear strip is one essentially identical in structure and operation to the second embodiment (as shown in FIGS. 4 to 6), except that it further includes a narrow tear strip (as previously described) removably adhered to adhesive 2 along an edge of the waterproofing membrane. After the membrane of this embodiment is unrolled, it will have the structure shown in FIG. 9 and will provide an exposed adhesive surface as shown in FIG. 10 when the tear strip is removed. With either the third or fourth embodiments, the membrane alternatively may be made with layers C and D abutting, but not overlapping, the tear strip, or with layers C and D only partially (or completely) overlapping the tear strip.

Layer A comprises a waterproofing adhesive 2, which provides waterproofing integrity for the waterproofing membrane. The waterproofing adhesive may comprise a non-bituminous pressure sensitive adhesive or a rubber modified bitumen pressure sensitive adhesive. The adhesive layer typically will have a thickness of about 0.05 to 2.5 mm, preferably about 0.07 to 2.0 mm, more preferably about 0.1 to 1.0 mm, most preferably about 0.2 to 0.8 mm.

Suitable non-bituminous, or synthetic, pressure sensitive adhesives include butyl rubber based adhesives, polyisobutylene based adhesives, butyl based adhesives, acrylic based adhesives, vinyl ether based adhesives, styrene-isoprene-styrene (SIS) based adhesives, styrene-ethylene-butylene-styrene (SEBS) based adhesives, styrene-butadiene-styrene (SBS) based adhesives, styrene-butadiene rubber (SBR) based adhesives, and combinations thereof. Preferably, the synthetic adhesive is a pressure sensitive hot melt adhesive block copolymer of SIS, SBS or SEBS, most preferably SIS block copolymer. For a more detailed description of pressure sensitive adhesives, see Satas, Handbook Of Pressure Sensitive Adhesive Technology, by Van Nostrand Reinhold Company, Inc. (1982), incorporated herein by reference. Other rubbers include polyisoprene, polybutadiene, natural rubber, polychloroprene rubber, ethylene-propylene rubber, ethylene alpha olefin, nitrile rubbers, and acrylic rubber.

The non-bituminous or synthetic pressure sensitive adhesive can optionally contain typical additives, such as light absorbers (e.g., carbon black, benzotriazoles, etc.), light stabilizers (e.g., hindered amines, benzophenones), antioxidants (e.g., hindered phenols), fillers (e.g., calcium carbonate, silica, titanium dioxide, etc.), plasticizers, rheological additives, and mixtures thereof. Preferred synthetic adhesives contain light absorbers, light stabilizers, and antioxidants.

A rubber modified bitumen pressure sensitive adhesive may also be used. All of the rubbers listed above (e.g., SIS, SBS, SEBS, SBR, etc.) may be blended with bitumen to produce a pressure sensitive adhesive. The rubber modified bitumen may also typically include a processing oil such as an aromatic, naphthenic or paraffinic oil. For unfilled adhesives, the wt. % rubber is about 10% to 22%; the wt. % bitumen is about 43% to 90%; and the wt. % processing oil is about 0% to 35%. The pressure sensitive adhesive may also comprise an inorganic filler such as silica, calcium carbonate, talc, or clay. If present, the wt. % filler may be about 0% to 50% of the total.

Generally, for improved adhesion to post cast concrete it is preferred that the pressure sensitive adhesive has a penetration greater than about 30 decimillimeters (dmm) (150 g, 5 sec., 70° F.) as measured according to ASTM D 5-73, incorporated herein by reference.

Layer B comprises a carrier sheet 4. The carrier sheet provides mechanical strength and waterproofing integrity for the membrane. The carrier sheet typically will have a thickness of about 0.05 to 2.0 mm, preferably about 0.3 to 1.0 mm. Generally, it is preferred that the bottom face of the carrier sheet (i.e., the face that contacts the bonding material 6 (layer C)) have a surface tension of 40 dynes/cm or less, preferably 35 dynes/cm or less. The carrier sheet should comprise a generally smooth surface to provide for easy release of the bonding material. Smooth surfaces include films, sheets, and extrusion coated woven and non-woven fabrics. Suitable materials for films and extrusion coatings include polypropylene, polyethylene, ethylene-propylene copolymers, ethylene-olefin copolymers, ethylene-vinyl acetate copolymers, polyvinyl acetate, polyethyl acrylate, polytetrafluoroethylene (PTFE), polyvinylidene fluoride (PVDF), polyethylene terephthalate (PET), polyvinyl chloride (PVC) and combinations thereof. Polyethylene and polypropylene are preferred. A preferred carrier sheet comprises a thermoplastic film of high density polyethylene (HDPE).

Generally, the carrier sheet is not surface treated to increase the surface tension. However, in some cases it may be desirable to treat the surface of the carrier sheet on which the adhesive will be applied in order to enhance adhesion of the adhesive to the carrier sheet. One such surface treatment option is corona treatment.

Additives may be incorporated into the carrier material to reduce surface tension. These may be incorporated into the bulk of the material in a separate compounding step. The additives may also be incorporated into the bulk of the material during the melt extrusion process to produce a sheet, film, or extrusion coated fabric.

Layer C comprises a releasable bonding material 6. The releasable bonding material may be any suitable material that will strongly adhere to the protective coating 8, but which will releasably adhere to the carrier sheet 4. In other words, the bonding material 6 (layer C) should be capable of being detached from carrier sheet 4 (layer B) when the membrane is unrolled. This means that the adhesion of layer C to layer B should be less than the adhesion of layer C to layer D (and also less than the adhesion of layer D to layer A) when the membrane is unrolled. Typically, layer C will have a thickness (dry) of about 0.1 to 20 μm, preferably about 0.5 to 5 μm.

Three different types of materials may be used as the releasable bonding material 6 (layer C). These include water soluble polymers, alkali soluble polymers, and homopolymers or copolymers of polyvinyl acetate.

In one embodiment, the releasable bonding material 6 (layer C) is hydrophilic and will generally comprise a water soluble polymer. Suitable water soluble polymers may include polyvinyl alcohol (PVOH), polyethylene oxide (PEO), water soluble cellulosic polymers (e.g., hydroxypropyl methyl cellulose, hydroxyethyl cellulose), hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid) and alkali metal salts thereof, natural or synthetically modified polysaccharides, proteins, alginates, xanthan gums, and guar gums. The preferred water soluble polymer is polyvinyl alcohol.

Since the bonding material is hydrophilic, it may be completely or partially removed by exposure to water (e.g., rainfall) after the membrane is installed, but before concrete is cast against it. However, concrete will strongly adhere to any residual bonding material and/or to the protective coating.

In another embodiment, the releasable bonding material 6 (layer C) may comprise an alkali soluble polymer. In accordance with the present invention, an alkali soluble polymer is defined as a polymer that is insoluble below pH 5 and soluble, or at least partially soluble or swellable, above pH 8.

An alkali soluble polymer is a preferred material for the bonding material because it improves the bond to concrete. Without being bound by any theory, it is postulated that a proposed mechanism for bond formation between the alkali soluble polymer and concrete can be described as follows. When concrete is cast against the alkali soluble polymer layer it may dissolve, partially dissolve, swell, or partially swell. The polymer is rendered soluble or swellable by reaction of the hydrophilic monomers with alkaline species like calcium hydroxide within the concrete. Anhydrides and carboxylic acids both react with calcium hydroxide to form calcium carboxylate salts. Phenol will also react with calcium hydroxide to form a salt. In one of these states the polymer layer may diffuse or partially diffuse into the concrete. Once the concrete sets, the polymer layer and membrane are bonded to the concrete. Alternatively, only the surface (or a thin layer at the surface) of the alkali soluble polymer layer may be affected by reaction with calcium hydroxide in the concrete. While these calcium salts may be insoluble, partially soluble, or swellable, it is believed the salt formation contributes to the bond between the membrane and concrete cast and cured against the bonding material surface of the membrane.

The alkali soluble polymer may comprise one or more hydrophilic monomers and one or more hydrophobic monomers. Hydrophilic monomers are selected from a list including maleic anhydride, a combination of maleic anhydride and a mono-ester/monocarboxylic acid, methacrylic acid, acrylic acid, and vinyl phenol. Hydrophobic monomers are selected from a list including acrylic esters, methacrylic esters, styrene, alpha methyl styrene, alkenes, ethylene, propylene, isobutylene, vinyl chloride, and octadecene.

One type of preferred alkali soluble polymer includes copolymers of styrene and maleic anhydride such as those manufactured by Sartomer. The ratio of styrene to maleic anhydride ranges from 1:1 to 8:1. The number average molecular weight ranges from 2000 to 12,000. Most preferred is SMA 3000 with a styrene:maleic anhydride ratio of 3:1.

Another type of preferred alkali soluble polymer includes copolymers of styrene, maleic anhydride and mono-ester/monocarboxylic acid (e.g., half-ester of maleic anhydride) such as those manufactured by Sartomer. The acid value in milligrams of KOH per gram of polymer ranges from 90 to 300. The number average molecular weight ranges from 2000 to 6000. Most preferred are SMA 2625 and SMA 3840.

A further type of preferred alkali soluble polymer includes acrylic acid and styrene and/or alpha-methyl styrene type polymers manufactured by BASF under the trade name of Joncryl. Most preferred are Joncryl 680 and Joncryl 682.

An additional type of preferred alkali soluble polymer includes reaction products of hydroxypropyl-methyl cellulose such as those manufactured by Shin-Etsu under the trade name of AQOAT. The most preferred is AQOAT ASHG. This is hydroxypropyl methylcellulose acetate succinate.

Another type of preferred alkali soluble polymer includes copolymers of methacrylic acid and methylmethacrylate such as those manufactured by Evonik under the trade name EUDRAGIT®. Most preferred is EUDRAGIT® S 100.

Another type of preferred alkali soluble polymer includes acrylic acid-ethyl acrylate-methyl methacrylate copolymer such as that manufactured by Lubrizol under the trade name Avalure. Most preferred is Avalure 315. A further type of preferred alkali soluble polymer is a copolymer of methylmethacrylate, ethyl methacrylate and acrylic acid. This is commercially available from Lubrizol as Carboset 526. An additional type of preferred alkali soluble polymer is a copolymer of ethyl acrylate, methylmethacrylate, and acrylic acid. This is commercially available from Lubrizol as Carboset 525.

Another example of an alkali soluble polymer is a rosin acid. Yet another example of an alkali soluble polymer is a phenolic resin, such as a condensation product of phenol and formaldehyde. Suitable phenolic resins include phenolic novolac resins such as those manufactured by Georgia-Pacific. Most preferred is Georgia-Pacific resin CK-2400.

Accordingly, a preferred alkali soluble polymer may be selected from the group consisting copolymers of styrene and maleic anhydride, copolymers of styrene, maleic anhydride and half-ester of maleic anhydride, copolymers of acrylic acid and styrene and/or alpha-methyl styrene, hydroxypropyl methylcellulose acetate succinate, copolymers of methacrylic acid and methyl methacrylate, copolymers of methyl methacrylate, ethyl methacrylate and acrylic acid, copolymers of ethyl acrylate, methyl methacrylate, and acrylic acid, a rosin acid, a phenolic resin, and combinations of one or more of these.

Alkali soluble polymers may be applied to a web in a continuous process as a solution of the alkali soluble polymer in an organic solvent, as a solution in aqueous ammonia, or as an aqueous emulsion. The aqueous emulsion is often referred to as an alkali soluble emulsion or ASE. At low pH the polymer is in the form of an aqueous emulsion. At high pH the polymer dissolves to form an aqueous solution.

In a further (and most preferred) embodiment, the releasable bonding material 6 (layer C) may comprise a homopolymer or a copolymer of polyvinyl acetate (PVAc). The most preferred polymer is polyvinyl acetate homopolymer. Solid polyvinyl acetate homopolymers (100% solids) are available from Wacker Chemie AG and Wacker Chemical Corporation under the trade name Vinnapas®. The weight average molecular weight ranges from 10,000 g per mole to 500,000 g per mole, preferably from 20,000 g per mole to 350,000 g per mole. Typically, these will have a glass transition temperature in the range from 33° C. to 44° C. depending on the molecular weight. Generally, the higher molecular weight polymers have higher glass transition temperatures. Other 100% solids polyvinyl acetate homopolymers are also manufactured by McGean.

The proposed mechanism by which polyvinyl acetate homopolymer bonds to concrete cast against it is somewhat different than the mechanism proposed above for bonding of copolymers comprising acrylic acid, methacrylic acid, vinyl phenol, or maleic anhydride. While not being bound by any theory, it is believed that the polyvinyl acetate hydrolyzes to form polyvinyl alcohol while in contact with highly alkaline concrete. The water soluble polyvinyl alcohol dissolves in the concrete and becomes intimately bonded with the concrete once the concrete has set. Since the polyvinyl acetate is not easily hydrolyzed at lower pH, e.g. pH 7, it cannot be washed off by rain. The polyvinyl acetate layer is also non-tacky and will not bond well to the carrier sheet (layer B), thus permitting easy unrolling of the membrane and eliminating the need for a release liner.

Since polyvinyl acetate homopolymer is somewhat brittle, it may be desirable to blend the PVAc with a softening material, such as a plasticizer or one or more flexible polymers. Suitable plasticizers include, but are not limited to, phthalates (e.g., dimethyl-, diethyl-, dibutyl-, and butylbenzyl-phthalate), benzoates (e.g., diethylene glycol dibenzoate and dipropylene glycol dibenzoate), phosphates (tributyl-, tricresyl-, triphenyl-, and tributoxyethyl-phosphate), and triacetine (glycerol triacetate). Generally, the plasticizer level may be any suitable amount sufficient to soften the polyvinyl acetate layer, with the maximum plasticizer level being no more than 30% by weight of the bonding layer (i.e., the combination of plasticizer plus polyvinyl acetate homopolymer).

Flexible polymers that are miscible (single phase blend) or compatible (two phase blend) with PVAc are preferred. These include chlorinated paraffins, polymethylacrylate, polyethylacrylate, copolymers of methyl acrylate and acrylic acid (10% to 20% acrylic acid), copolymers of ethyl acrylate and acrylic acid (10% to 20% acrylic acid), copolymers of butyl acrylate and acrylic acid (10% to 20% acrylic acid), copolymers of vinyl acetate with ethylene, copolymers of vinyl acetate and acrylic esters including methyl acrylate, ethyl acrylate, butyl acrylate, and ethyl-hexyl acrylate, copolymers of vinyl acetate and vinyl versatate, and copolymers of vinyl acetate and vinyl laurate. Preferably, the polyvinyl acetate homopolymer will comprise at least 40%, more preferably at least 50%, most preferably at least 60%, by weight of the polymer blend.

Copolymers of polyvinyl acetate are most preferred and include copolymers of vinyl acetate with ethylene, copolymers of vinyl acetate and acrylic esters including methyl acrylate, ethyl acrylate, butyl acrylate, and ethyl-hexyl acrylate, copolymers of vinyl acetate and vinyl versatate, and copolymers of vinyl acetate and vinyl laurate.

Copolymers of a vinyl acetate and vinyl laurate are available from Wacker, also under the tradename Vinnapas®. Two such products are Vinnapas® B500/VL20 and Vinnapas® B500/VL 40, which comprise 20% vinyl laurate and 40% vinyl laurate, respectively. These copolymers have glass transition temperatures of 21° C. and 0° C., respectively, and are solid resins. Preferably, the minimum vinyl acetate content for a suitable copolymer of vinyl acetate and vinyl laurate is at least 50% by weight.

Copolymers of vinyl acetate and butyl acrylate are available from several commercial sources, including, for example, Dow Chemical, such as UCAR 162 and UCAR 357. These have glass transition temperatures of 12° C. and 23° C., respectively, and are available as aqueous emulsions. The manufacturer does not publish comonomer contents. Using the Fox equation ($1/T_{gblend} = W_A/T_{gA} + W_B/T_{gB}$, where $W_A$ & $W_B$ are the weight fraction of each monomer), a glass transition temperature for polyvinyl acetate of 33° C. and a glass transition temperature for poly butyl acrylate of −49° C., one can calculate the vinyl acetate content of UCAR 162 and UCAR 357 as 80% and 91%, respectively. Preferably, the minimum vinyl acetate content for copolymers of vinyl acetate and butyl acrylate is at least 50% by weight.

Copolymers of vinyl acetate and an acrylic ester are also available from Air Products, such as, for example, Flexbond® 325, which is a copolymer of vinyl acetate and butyl acrylate, and Flexbond® 381. These have glass transition temperatures of 12° C. and 19° C., respectively, and are available as aqueous emulsions. Preferably, the minimum vinyl acetate content for copolymers of vinyl acetate and an acrylic ester is 50% by weight.

Copolymers of vinyl acetate and ethylene with high vinyl acetate content are available from Air Products, such as, for example, Airflex® 7200, Airflex® 400, and Airflex® EF500, which are aqueous emulsions. The glass transition temperatures for the aforementioned three copolymers are 0° C., 0° C., and 5° C., respectively. Using the Fox equation, a glass transition temperature for polyvinyl acetate of 33° C. and a glass transition temperature for polyethylene of −80° C., one can calculate the vinyl acetate contents of the three copolymers as 80%, 80%, and 83%, respectively. Preferably, the minimum vinyl acetate content for copolymers of vinyl acetate and ethylene is at least 70% by weight.

Copolymers of vinyl acetate and vinyl versatate are available from Celanese under the trade names Celvolit 2456 and Mowilith LDM 2110 and have glass transition temperatures of 19° C. and 15° C., respectively. The manufacturer does not publish comonomer contents of these aqueous emulsions. Using the Fox equation, a glass transition temperature for polyvinyl acetate of 33° C. and a glass transition temperature for polyvinyl versatate of −3° C., one can calculate the vinyl acetate content of Celvolit 2456 and Mowilith LDM 2110 as 64.5% vinyl acetate and 53.5% vinyl acetate, respectively. Preferably, the minimum vinyl acetate content for copolymers of vinyl acetate and vinyl versatate is at least 50% by weight.

Layer C may also comprise a copolymer of vinyl acetate and no polyvinyl acetate homopolymer. Copolymers of the type described above may be used where such copolymers have a glass transition temperature is greater than or equal to 5° C. Vinyl acetate copolymers with a glass transition temperature greater than or equal to 10° C. are preferred.

Polyvinyl acetate and copolymers of polyvinyl acetate may be applied to a web in a continuous process as a solution of the polymer in an organic solvent, or as an aqueous emulsion.

Layer D comprises a protective coating 8. The protective coating comprises a particulate inorganic material and a weatherable elastomer or weatherable pressure sensitive adhesive. After affixing the unrolled waterproofing membrane to a substrate, the protective coating serves to protect the adhesive 2 (layer A) from the elements prior to casting concrete against it. Preferably, it also improves the adhesion to post-cast concrete. The particulate inorganic material may include calcium carbonate, sand, silicate sand, cement (including Portland cement, white Portland cement, calcium aluminate cement, calcium sulfoaluminate cement), talc, titanium dioxide, slate dust, granite dust, clay, fly ash, slag, metakaolinite, alumina trihydrate, hydrated ground cement (including Portland cement, white Portland cement, calcium aluminate cement, calcium sulfoaluminate cement), partially hydrated cement (including Portland cement, white Portland cement, calcium aluminate cement, calcium sulfoaluminate cement), and mixtures of two or more of these materials. Preferably, the particulate inorganic material will have an average particle size in the range of about 0.1-1000 µm, and more preferably in the range of about 0.2 to 100 µm. The level of inorganic material in layer D, on a dry solids basis, will typically be about 50% to 95% by weight, preferably about 70% to 90% by weight.

The weatherable elastomer or pressure sensitive adhesive may include acrylics (e.g., polyethylacrylate, polybutylacrylate, polyethylhexyl acrylate), SEBS, polyisobutylene, butyl rubber, silicone rubber, and combinations of these. Pressure sensitive adhesive binders are also preferred. Polybutylacrylate and polyethylhexyl acrylate are inherently pressure sensitive. Pressure sensitive adhesives comprising SEBS, polyisobutylene, silicone rubber, and butyl rubber are made by addition of a tackifier and or a plasticizer to the elastomer. Those skilled in the art are familiar with the formulation of pressure sensitive adhesives.

Generally, the dry coating weight of the protective coating 8 (layer D) will be about 5 $g/m^2$ to 400 $g/m^2$ on a dry solids basis, preferably about 20 $g/m^2$ to 150 $g/m^2$ on a dry solids basis. (Typically, layer D will have a thickness of about 0.01 to 0.30 mm, preferably about 0.02 to 0.07 mm.)

The protective coating may optionally contain typical additives, such as, light absorbers (i.e., carbon black, benzotriazoles, etc.), light stabilizers (i.e., hindered amines, benzophenones), concrete admixtures (e.g., set accelerators, set retarders, superplasticizers, water reducers, shrinkage reducers, corrosion inhibitors, biocides, etc.), dispersants, antifoams, antioxidants (i.e., hindered phenols), and mixtures thereof. Preferred protective coatings will contain light stabilizers and light absorbers.

Optional tear strip 5 may be any type of film or sheet that will loosely, but removably, adhere to adhesive 2 (layer A) and that, when removed, may take with it a corresponding portion of layers C-D (at least that portion of layers C-D that may overlap the tear strip). Suitable materials include polyolefin film or polyester film coated on one or both sides with a silicone release agent.

The waterproofing membrane of the present invention may manufactured via a process comprising the following steps:
(S1) coating the bonding material 6 (layer C) onto the carrier sheet 4 (layer B) and drying;
(S2) coating the protective coating 8 (layer D) onto the releasable bonding material 6 (layer C) and drying;
(S3) either (i) coating the adhesive 2 (layer A) onto the uncoated face of carrier sheet 4 (layer B) for the first embodiment; or (ii) coating the adhesive 2 (layer A) onto the protective coating 8 (layer D) for the second embodiment; and
(S4) winding the four-layer laminate into a roll with the adhesive (layer A) facing inwards (i.e., against the core of the roll) and (i) the protective coating (layer D) facing outwards for the first embodiment or (ii) the carrier sheet (layer B) facing outwards for the second embodiment.

Alternatively, the membrane may be manufactured via a process comprising the following steps:
(S1) coating the bonding material 6 (layer C) onto the carrier sheet 4 (layer B), drying and optionally winding the two-layer laminate into a roll;
(S2) unwinding the roll (if wound), coating the protective coating 8 (layer D) onto the bonding material 6 (layer C), drying and winding the three-layer laminate into a roll;
(S3) unwinding the roll, either (i) coating the adhesive 2 (layer A) onto the uncoated face of carrier sheet 4 (layer B) for the first embodiment; or (ii) coating the adhesive 2 (layer A) onto the protective coating 8 (layer D) for the second embodiment;
(S4) winding the four-layer laminate into a roll with the adhesive (layer A) facing inwards and (i) the protective coating (layer D) facing outwards for the first embodiment or (ii) the carrier sheet (layer B) facing outwards for the second embodiment.

After the four-layer laminate (i.e., with layers arranged as A-B-C-D or B-C-D-A) is wound into a roll, the roll may be stored as is or, preferably, it may be subjected to the further step (S5) of unwinding the roll (i.e., during the manufacturing process) to produce a membrane with the layers arranged in the order C-D-A-B, which is the desired final order of the laminated layers. In this way, the membrane can be inspected for quality control. Then the membrane may be (S6) wound into a roll with releasable bonding material 6 (layer C) facing inwards and carrier sheet 4 (layer B) facing outwards. This roll will then be ready for sale to and use by the installer.

For embodiments comprising release strip 5, the manufacturing process will include the additional step of applying the release strip to one edge of the adhesive 2 (layer A) or to one edge of the protective coating 8 (layer D) prior to winding the four-layer laminate into a roll.

The bonding material 6 (layer C) (e.g., as an organic solvent solution or an aqueous emulsion or an aqueous solution, depending on the polymer type) may be applied to the carrier sheet 4 (layer B) by any one of a variety of applicators, including wire wound rod, roll coater, knife over roll coater, gravure, or slot die coater. If the carrier sheet is not very smooth, such as an extrusion coated fabric, roll coater, knife over roll coater, or slot die coater is preferred in order to apply a uniformly thick bonding material. The coated bonding material is typically dried in a forced hot air oven.

The protective coating 8 (layer D) may be applied to the bonding material 6 (layer C) by any one of a variety of applicators including wire wound rod, roll coater, knife over roll coater, gravure, or slot die coater. If the carrier sheet is not very smooth, such as an extrusion coated fabric, roll coater, knife over roll coater, or slot die coater is preferred in order to apply a uniformly thick protective coating. The coated protective coating is typically dried in a forced hot air oven. The protective coating may be applied as a solution comprising an organic solvent, rubber and or pressure sensitive adhesive, and filler (i.e., particulate inorganic material); as an aqueous mixture comprising water, a dispersion of rubber and or pressure sensitive adhesive, and filler; or as a 100% solids composition comprising rubber and or pressure sensitive adhesive, and filler. An organic solvent composition is preferred.

The adhesive 2 (layer A) may be applied as a hot melt, an organic solvent based coating, or an aqueous coating. Hot melt coating is preferred. A hot melt coating may be applied by slot die, knife over roll coater or hot melt coater. Solvent or water based coatings may be applied by the same methods as well as wire wound rod application.

When the roll of waterproofing membrane is unwound, the releasable bonding material (layer C) releases from the carrier sheet (layer B) and remains adhered to the protective coating (layer D), which is now adhered to the adhesive (layer A). Thus, after unrolling, the membrane has its layers arranged in the order C-D-A-B. This is a particularly unique feature of the present invention. Unrolling is affected without the need for a silicone treated surface and or a separate silicone coated release liner. The first and last unwraps from the roll may need to be discarded.

EXAMPLE 1

An HDPE carrier sheet (layer A) of 0.38 mm thickness has a gloss finish on one side and a matte finish on the other side. The surfaces of the HDPE sheet are not treated by corona treatment or other treatment. The gloss sides of three HDPE sheets are coated, respectively, via draw down bars with a 10% aqueous solution of polyvinyl alcohol (Elvanol 52-22 from DuPont) to a wet thickness of 0.013 mm, 0.025 mm and 0.051 mm, respectively. The coatings are dried at room temperature overnight. This polyvinyl alcohol layer is the bonding material (layer C). A 0.076 mm thick layer (wet thickness) of a protective coating (layer D) comprising 40% ethyl acetate, 10% heptane, 7.5% acrylic polymer (HyTemp 4051CG by Zeon Chemicals), 35% 325 mesh calcium carbonate, 5% titanium dioxide, 0.5% dispersant, and 2.0% hindered amine stabilizer is coated onto all three HDPE/polyvinyl alcohol laminates with a draw down bar (i.e., onto the polyvinyl alcohol layer). This is the protective coating layer. A pressure sensitive adhesive (layer A) may be coated onto the matte side (i.e., carrier sheet) of each three-layer composite comprising the HDPE/bonding material/protective coating, then the four-layer laminate is wound into a roll with the adhesive side facing inwards. This roll of laminate may be unwound to provide a waterproofing membrane with a laminate structure arranged as bonding material/protective coating/adhesive/HDPE.

The ease of release of the bonding material from the gloss face of the HDPE sheet is tested using the following method. A tape comprising a separate polyethylene carrier and 10 mils of an SIS adhesive was applied to the protective coating face of each of the aforedescribed three-layer composites comprising the HDPE/bonding material/protective coating. The 2" wide specimens were heated in an oven at 160° F. (71° C.) for 24 hrs and cooled. The ease of release of the bonding material from the gloss face of the HDPE sheet was measured in a peel test at 2"/min. with an Instron mechanical tester. For all three samples the bonding material released easily from the gloss face of the HDPE sheet. The peel adhesion values for the samples made with 0.013 mm, 0.025 mm and 0.051 mm of the 10% solution of polyvinyl alcohol were 0.005 N/mm, 0.005 N/mm and 0.010 N/mm, respectively.

One of the above membranes (the one with the 0.025 mm polyvinyl alcohol coating) is tested for bond to concrete. After cutting the membrane into 1 inch wide strips, concrete is cast against the bonding material (layer C—polyvinyl alcohol) face of the membrane and cured for seven days. Adhesion between the membrane and cured concrete (bond-to-concrete or B-T-C) is measured with an Instron mechanical testing device, using a peel angle of 90° and a peel rate of 2 in/min (5.1 cm/min), to provide a B-T-C value in pounds per lineal inch (pli). The bond to concrete for this sample is 19 pli.

EXAMPLE 2

A number of laboratory scale samples are prepared as described below in which the bonding material (layer C) comprises an alkali soluble polymer or a polyvinyl acetate homopolymer. Various forms of alkali soluble polymers are used including an aqueous solution of the polymer neutralized with ammonia, an organic solvent solution of the polymer, and an emulsion (as identified in the Table below). An organic solvent-based solution of polyvinyl acetate homopolymer is used. A drawdown of the coating is cast onto a non-corona treated high-density polyethylene sheet. The thickness of the wet coating is adjusted to yield the targeted thickness of the bonding material (layer C) after drying at room temperature. A protective coating (layer D) comprising a 7% acrylic rubber (Hytemp 4051), 35% calcium carbonate, 5% titanium dioxide, 2% antioxidant, and 51% organic solvent (ethyl acetate/heptane) is prepared. Two mils (0.051 mm) of this protective coating are coated on top of the dry alkali soluble polymer coating (bonding material layer C) and dried at room temperature. The adhesive face of a two layer membrane comprising a high-density polyethylene carrier sheet (layer B) and 15 mils of an SIS pressure sensitive waterproofing adhesive (layer A) is applied to the protective coating (layer D) of the aforedescribed 3-layer composite (i.e., HDPE sheet, bonding material (layer C) and protective coating (layer D—dried acrylic rubber coating) and pressure applied to ensure good contact between the pressure sensitive adhesive (layer A) and the protective coating (layer D), thus forming a five-layer structure comprising high-density polyethylene sheet, bonding material (layer C), protective coating (layer D), waterproofing adhesive (layer A), and carrier sheet (layer B). The bond between the high-density polyethylene sheet and the bonding material (layer C) is very low. This sheet is removed leaving a four-layer membrane comprising layers C-D-A-B, wherein layer C, in this case, is an alkali soluble polymer coating or a PVAc coating. (Alternatively, these membranes can also be prepared following the other previously described techniques, wherein the layers are arranged in the order A-B-C-D or B-C-D-A prior to being rolled into a roll, then unrolled to form the C-D-A-B layered membrane.)

Each of the four-layer membranes prepared is cut into 1 inch wide strips. Concrete is cast against the bonding material (layer C—alkali soluble polymer or PVAc) face of the membrane and cured for seven days. Adhesion between the membrane and cured concrete (bond-to-concrete or B-T-C) is measured with an Instron mechanical testing device, using a peel angle of 90° and a peel rate of 2 in/min (5.1 cm/min), to provide a B-T-C value in pounds per lineal inch (pli). B-T-C values for all the samples prepared and the control (sample 1 with no bonding material) are given in the Table. A B-T-C greater than 5 pli is good and a B-T-C greater than or equal to that for the control is preferred.

Nearly all samples exhibit good to excellent bond to concrete (B-T-C). Some of the lower bond strengths are exhibited by alkali soluble polymer layers cast from an aqueous emulsion or aqueous solution. Much better bond strengths are measured for alkali soluble polymer layers cast from organic solvent-based solutions, as well as for the sample comprising polyvinyl acetate.

TABLE

| No | Polymer Name | Polymer Type | Solvent | Layer C (μm) | B-T-C |
|----|---|---|---|---|---|
| 1 | None | None | | NA | 10.6 |
| 2 | SMA 3000 | Styrene maleic anhydride | 10% in MEK | 1 | 9.1 |
| 3 | CK2400 phenolic | Phenolic novolac | 10% in MEK | 1 | 8.0 |
| 4 | Drewthix 53L | Alkali soluble emulsion | emulsion | 0.5 mils wet | 3.2 |
| 5 | SMA 2625 | Styrene maleic anhydride and mono-ester/mono carboxylic acid | 10% in MEK | 1 | 11.9 |
| 6 | SMA 3000 | Styrene maleic anhydride | 10% in MEK | 3 | 10.7 |
| 7 | SMA 2625 | Styrene maleic anhydride and mono-ester/mono carboxylic acid | 10% in MEK | 3 | 9.6 |
| 8 | Neocryl CL 300 | alkali-soluble metal-complexed acrylic copolymer | aqueous solution | 5 | 11.2 |
| 9 | Joncryl 50 | Acrylic acid-α-methylstyrene-styrene copolymer neutral w/NH₃ | aqueous solution | 6.3 | 0.5 |
| 10 | Joncryl 50 | Acrylic acid-α-methylstyrene-styrene copolymer neutral w/NH₃ | aqueous solution | 1 | 1.7 |
| 11 | AQOAT AS-HG cellulosic | Hydroxypropyl methylcellulose acetate succinate | 10% in acetone | 1 | 11.8 |
| 12 | Joncryl 682 | Acrylic acid-α-methylstyrene-styrene copolymer | 10% in ethyl acetate | 1 | 3.6 |
| 13 | Joncryl 680 | Acrylic acid-α-methylstyrene-styrene copolymer | 10% in ethyl acetate | 1 | 7.5 |
| 14 | SMA 2625/sylowite SM405 (1/3) | Styrene maleic anhydride and mono-ester/mono carboxylic acid | 10% in MEK | 2 | 11.0 |
| 15 | SMA 2625 | Styrene maleic anhydride and mono-ester/mono carboxylic acid | 10% in MEK | 1 | 12.2 |
| 16 | SMA 3000 | Styrene maleic anhydride | 10% in MEK | 1 | 7.0 |
| 17 | AQOAT AS-HG cellulosic | Hydroxypropyl methyl-cellulose acetate succinate | 10% in acetone | 1 | 19.2 |
| 18 | SMA 3000 | Styrene maleic anhydride | 10% in MEK | 0.5 | 9.5 |
| 19 | SMA 2625 | Styrene maleic anhydride and mono-ester/mono carboxylic acid | 10% in MEK | 0.5 | 10.7 |
| 20 | AQOAT AS-HG cellulosic/citric acid (9/1) | Hydroxypropyl methylcellulose acetate succinate | 10% in acetone | 1 | 13.4 |
| 21 | EUDRAGIT® S 100 | Copolymer of methylmethacrylate and methacrylic acid | 10% in MEK | 1 | 20.2 |
| 22 | AQOAT AS-HG cellulosic/citric acid (9/1) | Hydroxypropyl methylcellulose acetate succinate | 10% in MEK | 1 | 17.7 |
| 23 | SMA 3000/ citric acid (9/1) | Styrene maleic anhydride | 10% in MEK | 1 | 10.0 |
| 24 | Avalure 315 | Acid-ethyl acrylate-methyl methacrylate copolymer | 10% in MEK | 1 | 14.5 |
| 25 | SMA 3840 | Ethenylbenzene, 2,5-furandione and 1-methylethylbenzene, partial isomeric octyl alcohol ester | 10% in MEK | 1 | 6.6 |
| 26 | SMA 2625 | Styrene maleic anhydride and mono-ester/mono carboxylic acid | 30% in MEK | 2 | 8.4 |
| 27 | SMA 2625 | Styrene maleic anhydride and mono-ester/mono carboxylic acid | 30% in MEK | 3 | 6.6 |
| 28 | Avalure 315 | Acid-ethyl acrylate-methyl methacrylate copolymer | 30% in MEK | 2 | 8.8 |
| 29 | Avalure 315 | Acid-ethyl acrylate-methyl methacrylate copolymer | 30% in MEK | 3 | 12.4 |
| 30 | CK2400 phenolic | Phenolic novolac | 30% in MEK | 2 | 1.9 |
| 31 | CK2400 phenolic | Phenolic novolac | 30% in MEK | 3 | 1.6 |
| 32 | AQOAT from 25% solution | Hydroxypropyl methylcellulose acetate succinate | 25% in ethanol | 2.5 | 12.4 |
| 33 | Vinnapas B100 | Polyvinyl acetate | 30% in MEK | 2.5 | 11.5 |
| 34 | Carboset 526 | methylmethacrylate, ethyl methacrylate and acrylic acid | 30% in MEK | 2.5 | 11.3 |

The invention claimed is:

1. A waterproofing membrane comprising the following laminated layers:

layer A comprising a waterproofing adhesive;

layer B comprising a carrier sheet;

layer C comprising a releasable bonding material; and layer D comprising a protective coating;

wherein the releasable bonding material (layer C) is a material that will strongly adhere to the protective coating (layer D) and releasably adhere to the carrier sheet (layer B), has a thickness (dry) of about 0.1 to 20 μm, and comprises a water soluble polymer, an alkali soluble polymer or a homopolymer or copolymer of polyvinyl acetate;

wherein the membrane does not include a removable release sheet; and wherein (i) the laminated layers are arranged in the sequential order A-B-C-D;

or (ii) the laminated layers are arranged in the sequential order B-C-D-A;

or (iii) the laminated layers are arranged in the sequential order C-D-A-B.

2. The waterproofing membrane of claim 1 wherein (i) the laminated layers are arranged in the sequential order A-B-C-D prior to the membrane being rolled into a roll.

3. The waterproofing membrane of claim 2 rolled into a roll, wherein layer D comprises the outermost layer of the roll and layer A comprises the innermost layer of the roll.

4. The waterproofing membrane of claim 3 wherein the laminated layers are arranged in the sequential order C-D-A-B when the membrane is unrolled from the roll.

5. The waterproofing membrane of claim 1 wherein (ii) the laminated layers are arranged in the sequential order B-C-D-A prior to the membrane being rolled into a roll.

6. The waterproofing membrane of claim 5 rolled into a roll, wherein layer B comprises the outermost layer of the roll and layer A comprises the innermost layer of the roll.

7. The waterproofing membrane of claim 6 wherein the laminated layers are arranged in the sequential order C-D-A-B when the membrane is unrolled from the roll.

8. The waterproofing membrane of claim 1 wherein (iii) the laminated layers are arranged in the sequential order C-D-A-B when the membrane is unrolled from a roll.

9. The waterproofing membrane of claim 1 wherein the adhesive (layer A) has a thickness of about 0.05 to 2.5 mm, the carrier sheet (layer B) has a thickness of about 0.05 to 2.0 mm, and the protective coating (layer D) has a coating weight of about 5 $g/m^2$ to 400 $g/m^2$ on a dry solids basis.

10. The waterproofing membrane of claim 1 wherein the adhesive (layer A) has a thickness of about 0.1 to 1.0 mm, the carrier sheet (layer B) has a thickness of about 0.3 to 1.0 mm, the releasable bonding material (layer C) has a thickness (dry) of about 0.5 to 5 μm, and the protective coating (layer D) has a coating weight of about 20 $g/m^2$ to 150 $g/m^2$ on a dry solids basis.

11. The waterproofing membrane of claim 1 wherein the releasable bonding material (layer C) comprises a water soluble polymer selected from the group consisting of polyvinyl alcohol, polyethylene oxide, water soluble cellulosic polymers, hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid), alkali metal salts of poly(acrylic acid), natural or synthetically modified polysaccharides, proteins, alginates, xanthan gums, and guar gums.

12. The waterproofing membrane of claim 1 wherein the releasable bonding material (layer C) comprises polyvinyl alcohol.

13. The waterproofing membrane of claim 1 wherein the releasable bonding material (layer C) comprises an alkali soluble polymer selected from the group consisting copolymers of styrene and maleic anhydride, copolymers of styrene, maleic anhydride and half-ester of maleic anhydride, copolymers of acrylic acid and styrene and/or alpha-methyl styrene, hydroxypropyl methylcellulose acetate succinate, copolymers of methacrylic acid and methyl methacrylate, copolymers of methyl methacrylate, ethyl methacrylate and acrylic acid, copolymers of ethyl acrylate, methyl methacrylate, and acrylic acid, a rosin acid, a phenolic resin, and combinations of one or more of these.

14. The waterproofing membrane of claim 1 wherein the releasable bonding material (layer C) comprises a copolymer of styrene and maleic anhydride or a copolymer of styrene, maleic anhydride and half-ester of maleic anhydride.

15. The waterproofing membrane of claim 1 wherein the releasable bonding material (layer C) comprises a homopolymer or a copolymer of polyvinyl acetate.

16. The waterproofing membrane of claim 1 wherein the protective coating comprises a particulate inorganic material selected from the group consisting of calcium carbonate, sand, silicate sand, cement, talc, titanium dioxide, slate dust, granite dust, clay, fly ash, slag, metakaolinite, alumina trihydrate, hydrated ground cement, partially hydrated cement, and mixtures of two or more of these materials.

17. The waterproofing membrane of claim 1 wherein the protective coating comprises a particulate inorganic material selected from the group consisting of calcium carbonate, Portland cement, white Portland cement, hydrated ground Portland cement, hydrated ground white Portland cement, partially hydrated Portland cement, partially hydrated white Portland cement, and mixtures of two or more of these materials.

18. The waterproofing membrane of claim 17 wherein the protective coating additionally comprises a weatherable elastomer or a weatherable pressure sensitive adhesive.

19. The waterproofing membrane of claim 18 wherein the weatherable elastomer or pressure sensitive adhesive comprises an acrylate polymer, styrene-ethylene-butylene-styrene polymer, polyisobutylene, butyl rubber, silicone rubber, and mixtures of two or more of these.

20. The waterproofing membrane of claim 1 wherein the carrier sheet comprises a polymer film or a polymer coated fabric.

21. The waterproofing membrane of claim 20 wherein the carrier sheet comprises polyethylene, polypropylene, ethylene-propylene copolymers, ethylene-olefin copolymers, ethylene-vinyl acetate copolymers, polyvinyl acetate, polyethyl acrylate, polytetrafluoroethylene, polyvinylidene fluoride, polyethylene terephthalate, polyvinyl chloride or a combination of two or more of these materials.

22. The waterproofing membrane of claim 1 wherein the waterproofing adhesive (layer A) comprises a synthetic pressure sensitive adhesive or a rubber modified bitumen pressure sensitive adhesive.

23. The waterproofing membrane of claim 1 wherein the waterproofing adhesive (layer A) comprises a synthetic pressure sensitive adhesive comprising a butyl rubber based adhesive, a polyisobutylene based adhesive, a butyl based adhesive, an acrylic based adhesive, a vinyl ether based adhesive, a styrene-isoprene-styrene (SIS) based adhesive, a styrene-ethylene-butylene-styrene (SEBS) based adhesive, a styrene-butadiene-styrene (SBS) based adhesive, a styrene-butadiene rubber (SBR) based adhesive, or a combination of two or more of these materials.

24. The waterproofing membrane of claim 1 further comprising a narrow tear strip removably adhered to the waterproofing adhesive along an edge of the waterproofing membrane, said tear strip being positioned on the side of the adhesive opposite that which is adhered to the carrier sheet.

* * * * *